3,393,077
PACKAGING OF COMMINUTED MEAT PRODUCTS
Jean R. Moreau, Islington, Ontario, Canada, assignor to Canada Packers Limited, Toronto, Ontario, Canada
No Drawing. Filed Dec. 4, 1964, Ser. No. 416,121
1 Claim. (Cl. 99—174)

ABSTRACT OF THE DISCLOSURE

This invention relates to the packaging of comminuted meat products and in particular, to a process for packaging wieners in transparent films so as to provide a package having an attractive appearance in which the products will be preserved during prolonged storage life in substantially their original condition. This is accomplished by sealing the wieners in a gas-impervious transparent film in contact with a gas mixture containing a major proportion of carbon dioxide and a minor proportion of nitrogen, preferably about 85–95% by volume of carbon dioxide, with the remainder being nitrogen.

---

A general object of the invention is to provide an improved method for packaging comminuted meat products such as wieners.

Further objects of the invention are to provide a packaging method and package for wieners and the like which will result in good bacterial keeping time of the product, good color retention of the product under light, attractive appearance of the product with regards to shape, dryness and general appearance, attractive appearance of the package itself including good transparency, glossiness and tightness.

Because of the modern methods of display of food products in supermarket counters, the characteristics of the product color retention and package attractiveness have acquired a special importance over the last few years.

One of the most common methods of packaging wieners and the like consists of overwrapping a measured quantity of the products with transparent films such as cellophane, polyethylene, irradiated polyethylene, etc. It has been found that all of these films result in relatively poor color retention of the products and only irradiated polyethylene or other films which can be heat shrunk, provide a tight package. The bacterial keeping time for products so packaged usually varies from about 8 to 14 days at 45° F. The color shelf life rarely exceeds 50 hours under 100 ft. candles exposure.

One way of correcting the problem of poor color retention consists of eliminating air or oxygen by sealing the products under vacuum in a pouch of gas-impermeable film. A number of such films are available on the market, usually consisting of coated or laminated plastics. The color shelf life of the vacuum packaged products then matches and even exceeds the bacterial keeping time which may be about 16 to 20 days at 45° F. The vacuum packages are also extremely tight because of the pressure differential between the inside and surrounding atmosphere. However, the pressure differential in vacuum-packaged products also causes problems. In the case of wieners and other shaped comminuted meat products, it causes the original shape of the product to be distorted and additionally, may squeeze free liquid from the meat which then accumulates in an unsightly manner in the packages during storage. A quantity of as little as 3.0 grams of free liquid in a 1-lb. package gives a very poor appearance to the packaged product. Quantities of free liquid exceeding 8.0 grams are often encountered in vacuum packages.

In an effort to solve these problems, I have tried expelling air from gas-impermeable packages by flushing them with gases such as carbon dioxide or nitrogen before sealing. Carbon dioxide provides good color shelf life, good bacterial keeping time and a tight package following the absorption of the gas into the meat products, as carbonic acid. However, the problems of poor shape and free liquid accumulation are as objectionable as with vacuum package since the end product is substantially equivalent to a vacuum package. Further, I have found that nitrogen gas used for flushing provides swollen and extremely loose packages of dull appearance, with considerable fogging on the internal surface of the film resulting in limited product visibility.

I have now found that by using a carefully proportioned blend of carbon dioxide and nitrogen gases for flushing the packages and sealing the packages while the product is in contact with an atmosphere of the blended gases, excellent results are obtainable. Thus, I have found that by using a blend containing a major proportion of carbon dioxide and a minor proportion of nitrogen for flushing the packages before sealing, it is possible to produce packages of good external appearance with respect to tightness, gloss and absence of free liquid. Furthermore, products so packaged show very good color shelf life and bacterial keeping time. Surprisingly, the bacterial keeping time exceeds that even of vacuum packages, e.g., 18 to 24 days at 45° F.

In general, the proportion of carbon dioxide in the blended gases should be substantially above 50%. A preferred range of proportions for the two gases, which consistently provides good results comprises from about 85 to 95% carbon dioxide and 15 to 5% nitrogen by volume. A blend of 50% carbon dioxide and 50% nitrogen by volume provides packages which, although satisfactory in other aspects, are not as tight as desired.

The invention is further illustrated by the following examples of practice.

Example 1

A plurality of wieners from the same product run were placed in 1 lb. portions directly in conventional transparent, gas-impervious plastic pouches of a type commerically used for vacuum packaging and of one pound capacity. Some of these packages were flushed in accordance with the present invention with a blend of 85% by volume of $CO_2$ and 15% by volume of $N_2$ and were then sealed while the wieners were in contact with the flushing gases. Similarly, other packages were flushed with a blend of 90% of $CO_2$ and 10% of $N_2$ by volume and were sealed with the product in contact with the gaseous flushing atmosphere. For comparative purposes, other packages were flushed with pure $CO_2$ gas and with pure $N_2$ gas, respectively, and were then sealed while the products were in contact with the flushing gas. For further comparative purposes another group of these packages were evacuated under a vacuum of about 23 inches of mercury and were sealed under vacuum in the usual manner. Additionally, regular overwrap packages were prepared by placing one pound portions of the wieners on shallow trays, overwrapping them with irradiated low density polyethylene film, and heat shrinking the film by placing the packages in hot water so as to obtain a tight package. The results are evaluated in the following table:

TABLE I.—QUALITY CHARACTERISTICS OF WIENERS IN REGULAR OVERWRAP, VACUUM PACKAGES AND GAS PACKAGES OF VARIOUS TYPES

| | Test No. | Regular Overwrap | Vacuum Packages | Gas Packages | | | |
|---|---|---|---|---|---|---|---|
| | | | | 85% $CO_2$, 15% $N_2$ | 90% $CO_2$, 10% $N_2$ | 100% $N_2$ | 100% $CO_2$ |
| Free liquid accumulated in packages during normal storage. | | Nil | Considerable | Nil | Nil | Nil | Moderate. |
| Average free liquid in packages after 48–72 hrs. under 6 lbs. weight. | 1<br>2 | | 3.0 ml<br>5.0 ml | 0.0 ml<br>0.4 ml | | | 2.0 ml.<br>6.2 ml. |
| Bacterial keeping time, days at 45° F. | 1<br>2<br>3<br>4 | 9–10<br>17<br>12<br>14 | 19<br>21–22<br>18 | 19<br>23<br>17<br>19 | 18 | | 17.<br>18–19. |
| Color shelf-life under fluorescent (50 ft. candles). | 1<br>2 | 50 hrs<br>(¹) | >6 days<br>(¹) | >6 days<br>(¹) | >6 days<br>(¹) | 6> days<br>(¹) | >6 days.<br>(¹). |
| Wiener shape after normal shortage. | | Round | Square | Round | Round | Round | Square. |
| Package tightness | | Average-good | Very tight | Mod. tight | Mod. tight | Very loose | Very tight. |
| Product visibility | | Good | Good | Good | Good | Poor (fogging) | Good. |

¹ Almost endless.

The blends of gases containing 90% $CO_2$ and 10% $N_2$ and 85% $CO_2$ and 15% $N_2$ were about equally successful in providing wiener packages with good color retention, good shape retention, good bacterial keeping time, and good product and package appearance including excellent product visibility, absence of free liquid and satisfactory package tightness. After sealing, these packages initially showed a swollen condition which gradually disappeared in about 4 hours. Each of the other packaging alternatives was inferior to these gas combinations in one or more of the desired quality characteristics. For example, pure nitrogen gas provided loose packages of poor product visibility. Pure $CO_2$ gas packages and vacuum packages were extremely tight and undesirable due to free liquid accumulation and poor wiener shape, the wieners being distorted into square shapes.

The bacterial keeping time of the wieners in the packages with the blends of carbon dioxide and nitrogen was slightly better than with the vacuum packaging and was considerably better than with the regular overwrap. This finding has been corroborated by actual bacterial plate counts which reveal the bacterial count of the gas-packaged products to be very considerably lower at the end of the same storage period than that of the vacuum-packaged products.

On grilling, the wieners from the gas packages were at least as desirable as those from the vacuum and regular packages. There was no difference in flavor grading found between the gas-packaged and vacuum-packaged wieners.

Example 2

Wieners from another batch from regular plant product were divided into five lots and packaged as follows:

(a) Control—Packaged in regular, permeable, transparent, heat-shrinkable, irradiated polyethylene film overwrap.
(b) Test No. 1—Vacuum packaged in impermeable, transparent plastic pouches under 23 in. of vacuum.
(c) Test No. 2—Gas packaged in impermeable, transparent plastic pouches in an atmosphere of 85% $CO_2$ and 15% $N_2$ by volume.
(d) Test No. 3—Gas packaged in impermeable, transparent plastic pouches in an atmosphere of 90% $CO_2$ and 10% $N_2$ by volume.
(e) Test No. 4—Gas packaged in impermeable, transparent plastic pouches in an atmosphere of 95% $CO_2$ and 5% $N_2$ by volume.

After packaging, each of the samples was held overnight at 45° F. and was then exposed to fluorescent light at 100 ft. candles. After 96 hours' exposure, the product in the control packages had badly faded in the areas exposed to the light. The product in the vacuum packages had faded only moderately, but considerable unsightly liquid had separated from the wieners. In addition, the pressure of the atmosphere on the product had caused the wieners in the vacuum packages to be compacted into a square which gave them an unusual and undesirable appearance. The wieners in the three $CO_2$–$N_2$ gas atmospheres were about equivalent in all respects. All of them showed even less fading than those in the vacuum packages, yet the wieners were round and no free liquid or fogging of the package could be observed.

It will be understood that the preferred proportions of 85 to 95% by volume of $CO_2$ and 15 to 5% by volume of nitrogen are not sharply critical. The amount of carbon dioxide can be increased just short of that which causes the package to become so tight as to squeeze liquid from the packaged products. On the other hand, the proportion of carbon dioxide can be decreased just short of that which would result in a loose package. In all cases, however, the carbon dioxide will be present in the package in a major proportion with respect to the nitrogen.

It will also be understood that the gas-packaging procedure may be varied as desired. Thus, the entire operation can be conducted in an atmosphere of the blended gases as by use of automatic package filling means operating in the gaseous atmosphere, or the packages can be filled in the normal atmosphere of the packaging room, flushed with the gases and immediately sealed while the flushing gases are still in contact with the product. It will also be understood that the pressure of the blended gases initially sealed in the package may be substantially atmospheric pressure or slightly above or below atmospheric.

I claim:
1. A process for the packaging of wieners comprising placing said wieners in a transparent, gas-impervious, plastic pouch, flushing the air from said pouch with a gas mixture consisting of from about 85 to 95% by volume of carbon dioxide and from about 15 to 5% by volume of nitrogen, and sealing said pouch with the wieners therein being in contact with said gas mixture, whereby a wiener package is produced which has good external appearance with respect to tightness, gloss and absence of free liquid, and the packaged wieners have good color shelf life and bacterial keeping time.

References Cited

UNITED STATES PATENTS

| 970,623 | 9/1910 | Hemming | 99—189 |
| 1,011,352 | 12/1911 | Lescarde | 99—189 X |
| 1,017,144 | 2/1912 | Gironcoli. | |
| 2,309,007 | 1/1943 | Parsons. | |
| 2,925,346 | 2/1960 | Harper et al. | 99—189 X |

HYMAN LORD, *Primary Examiner.*